July 2, 1946.   C. A. EDSTROM   2,403,352
SNUBBER
Filed April 5, 1943   2 Sheets-Sheet 1

INVENTOR.
Carl A. Edstrom
BY
Arun O. B. Garner  Atty.

July 2, 1946.  C. A. EDSTROM  2,403,352
SNUBBER
Filed April 5, 1943  2 Sheets-Sheet 2
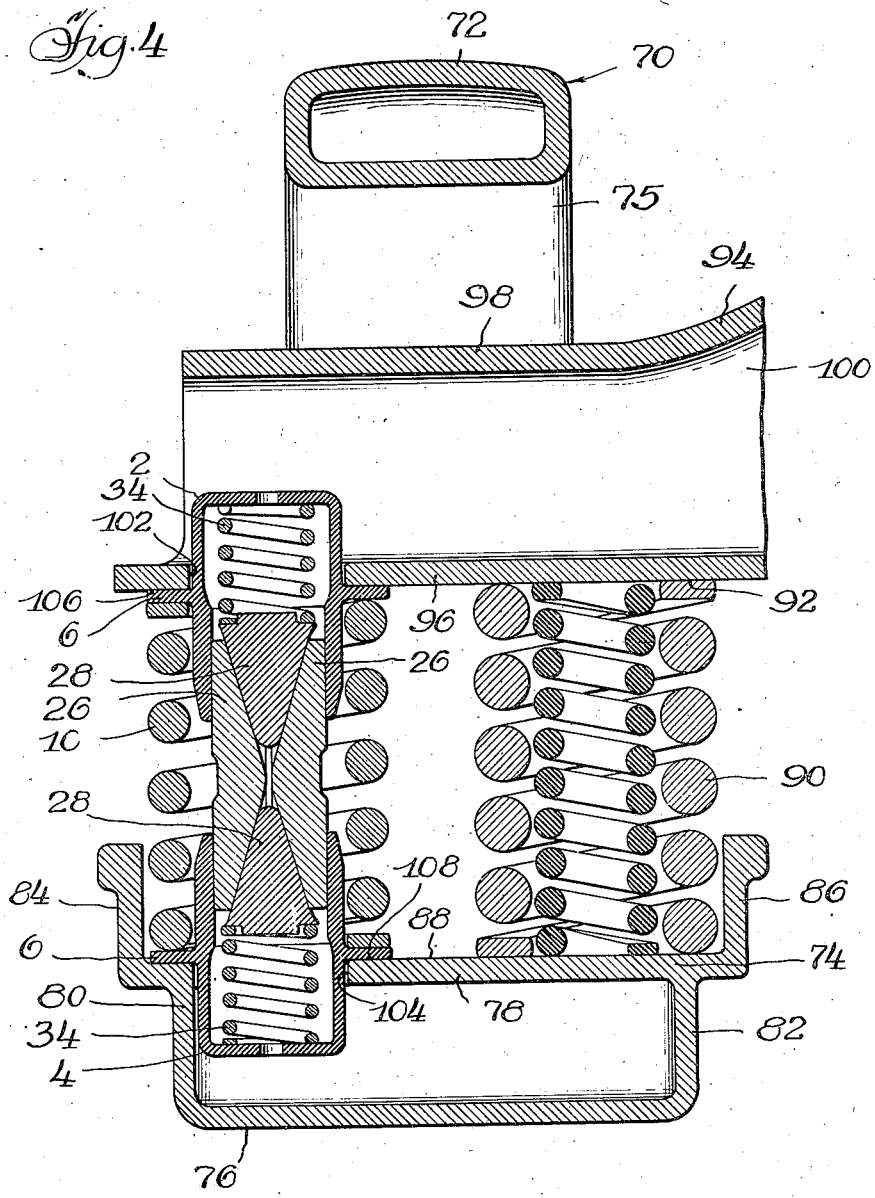
INVENTOR.
Carl A. Edstrom,
BY
Orin O. B. Garner
Atty.

Patented July 2, 1946

2,403,352

UNITED STATES PATENT OFFICE 2,403,352

SNUBBER

Carl A. Edstrom, Chicago, Ill., assignor to American Steel Foundries, Chicago, Ill., a corporation of New Jersey Application April 5, 1943, Serial No. 481,839

15 Claims. (Cl. 105—197)

My invention relates to snubbing means particularly adaptable for use in a railway car truck, but suitable, within the space limitations required, for use wherever frictional absorption of energy is desired.

The general object of my invention is to devise a form of friction device in which relatively large wearing areas may be had, and suitable resilient backing may be afforded for wedging means which serve to actuate the friction shoes in engagement with the respective followers.

Space limitations have been one of the principal difficulties heretofore encountered in providing suitable friction in a device for use on railway freight cars. The general plan heretofore has been to make the friction device of such form and size that it may be substituted for any one of several coil springs of standard size which normally are utilized as load supporting springs in freight car trucks. While it has been possible to accomplish this in various degree with different types of snubbers, nevertheless, many designs have been put forth which utilize a greater amount of space, and most of these have contemplated the displacement of one or more standard coils.

A specific object of my invention is to devise a form of friction device which may replace a single standard freight car coil, but which is so constructed and arranged with respect to the supporting and supported members as to permit the use of relatively large friction areas, and therefore, to increase the length of life and the general utility of the snubber.

A different object of my invention is to devise a novel form of snubber wherein identical top and bottom followers may be arranged for mounting in accommodating recesses in the supporting and supported members of the car truck in such manner as to afford additional space for parts of the friction device itself.

In the drawings,

Figure 4 is a view of a railway freight car truck embodying my invention, the view being taken in section transversely of the truck, and illustrating the manner of application of my device between the supporting and supported member, here illustrated as a side frame and bolster.

Figure 1:
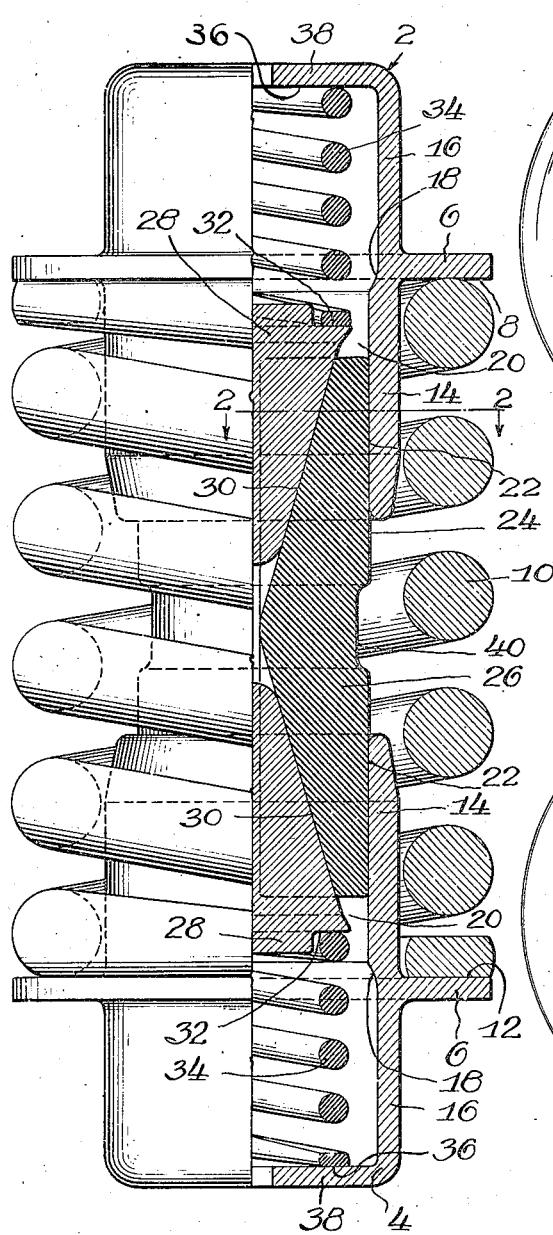
Figure 1 is a side elevation, half in section, of a friction device embodying my invention, the section being taken substantially along a radius bisecting the device through the middle of one friction shoe, substantially as indicated by the line 1—1 of Figure 2.

Describing in detail my novel friction device, the top follower 2, a cup-like structure, and the bottom follower 4 are identical, each being generally cylindrical and having intermediate its ends an annular flange 6, that of the upper follower affording a seat as at 8 for the upper end of the compression spring 10, and the corresponding flange of the lower follower affording a seat as at 12 for the lower end of said spring. Each friction follower is substantially cylindrical inside as well as out, but the wall 14 is somewhat thicker than the wall 16 with a tapered portion formed at 18 adjacent the edge of the cylindrical friction surface 20, thus avoiding the formation of shoulders as said friction surfaces are worn down. Each cylindrical friction surface 20 is in engagement as at 22 with a complementary friction surface 24 formed on the adjacent end of the friction shoe 26, the opposite end of said shoe having similar engagement with the other follower. The friction shoes 26, 26 are urged apart by a friction wedge 28 at each end of the device, said friction wedge having in this modification conical engagement as at 30 with each friction shoe. Each wedge 28 is afforded on its large end a seat as at 32 for an auxiliary spring 34, the opposite end of which may seat as at 36 against the end wall 38 of the adjacent follower. The central portion of each friction shoe 26 may be horizontally relieved or grooved as at 40 to prevent the formation of shoulders on the friction face 24.

Figure 2:
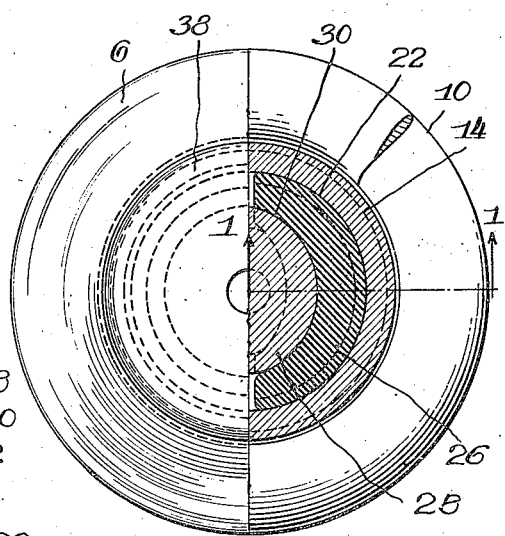
Figure 2 is a top view with the right half thereof in section in a horizontal plane through the friction device, substantially as indicated by the line 2—2 of Figure 1.
Figure 3:
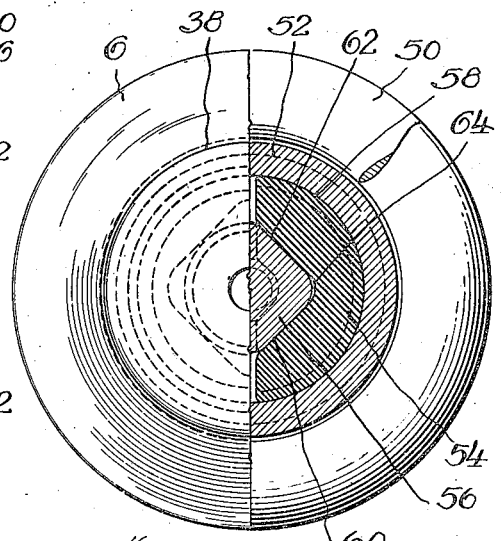
Figure 3 is a view comparable to Figure 2, but showing an alternate form of friction shoe and wedge.

In the modification illustrated in Figure 3, parts illustrated correspond to those of Figure 2 with the compression spring 50, the friction wall 52, the friction shoe 54, and the friction wedge 56. In this modification the engagement at 58 between the friction wall 52 of the follower and the friction shoe 54 is along complementary cylindrical surfaces thereof as in the modification illustrated in Figure 2. The engagement between the wedge 56 and each shoe, however, is V-shaped or pyramidal in form, one side of the pyramidal wedge having frictional engagement with the shoe 54 as at 60, and another face thereof having frictional engagement with the shoe as at 62. In this modification some slight clearance is afforded between the shoe and the wedge between the surfaces 60 and 62 as at 64, in order to accommodate a satisfactory fit under conditions of wear.

Figure 4 illustrates my novel device as applied to a railway freight car truck in which the side frame 70 comprises a box-section compression member 72 and a tension member 74 with a connecting column 75, said tension member having a bottom chord 76, a top chord 78, outboard and inboard walls 80 and 82, said top chord 78 being widened and formed with upstanding outboard and inboard flanges 84 and 86 defining a spring seat 88 upon which may be positioned a plurality of load supporting springs, as illustrated at 90. On the springs 90 may be carried as at 92 a bolster 94 of usual box-section having the bottom wall 96 and the top wall 98 and the side wall 100. As illustrated, the bottom wall 96 of the bolster, and the top chord 78 of the tension member are formed with vertically aligned openings 102 and 104 within which may be positioned the end portions of respective followers 2 and 4 of my novel form of friction device. By this means the flange 6 of the top follower is afforded a seat as at 106 against the bottom wall of the bolster, and the flange 6 of the bottom follower is afforded a seat as at 108 against the top chord 78. By this means spaces in the side frame and bolster which are normally unused will readily accommodate portions of each follower in which the auxiliary springs 34, 34 are housed so that a substantial amount of additional space is available for development of the desired amount of frictional absorption. This arrangement of recessing portions of the followers of the friction device in the supporting and supported members of the truck has the added advantage of positively positioning the friction device, and when so arranged the friction device may very largely prevent the side frame and bolster from becoming out of square with respect to each other and in restoring them to this relationship if some misalignment should result from side thrust or end thrust.

It is to be understood that I do not wish to be limited by the exact embodiments of the device shown which are merely by way of illustration and not limitation as various and other forms of the device will, of course, be apparent to those skilled in the art without departing from the spirit of the invention or the scope of the claims.

I claim:

1. In a railway freight car truck, a side frame having a tension member of box-section, a spring seat on said tension member, load supporting springs on said seat, a box-section bolster supported on said springs, aligned openings in the adjacent chords of said bolster and tension member, and a friction device between said side frame and bolster with opposite followers thereof recessed in said openings respectively, said friction device comprising a pair of friction shoes having cylindrical face engagement with respective followers, opposed wedge means operative to urge said friction shoes against said followers, and auxiliary springs between each wedge means and the adjacent follower, each of said wedge means having the form of a pramid and engaging each shoe along a plurality of adjacent flat faces with clearance therefrom intermediate said faces.

2. In a railway freight car truck, a side frame having a tension member of box-section, a spring seat on said tension member, load supporting springs on said seat, a box-section bolster supported on said springs, aligned openings in the adjacent chords of said bolster and tension member, and a friction device between said side frame and bolster with opposite followers thereof recessed in said openings respectively, said friction device comprising a pair of friction shoes having cylindrical face engagement with respective followers, opposed wedge means operative to urge said friction shoes against said followers, and auxiliary springs between each wedge means and the adjacent follower, each of said wedge means having the form of a pyramid and engaging each shoe along a plurality of adjacent flat faces.

3. In a railway freight car truck, a side frame having a tension member of box-section, a spring seat on said tension member, load supporting springs on said seat, a box-section bolster supported on said springs, aligned openings in the adjacent chords of said bolster and tension member, and a friction device between said side frame and bolster with opposite followers thereof recessed in said openings respectively, said friction device comprising a pair of friction shoes having cylindrical face engagement with respective followers, opposed wedge means operative to urge said friction shoes against said followers, and auxiliary springs between each means and the adjacent follower, each of said means having the form of a pyramid and engaging each shoe along two faces thereof.

4. In a railway freight car truck, a side frame having a tension member of the box-section, a spring seat on said tension member, load supporting springs on said seat, a box-section bolster supported on said springs, aligned openings in the adjacent chords of said bolster and tension member, and a friction device between said side frame and bolster with opposite followers thereof recessed in said openings respectively, said friction device comprising a pair of friction shoes having cylindrical face engagement with respective followers, opposed wedge means operative to urge said friction shoes against said followers, and auxiliary springs between each means and the adjacent follower, said means engaging said shoes along conical surfaces.

5. In a railway freight car truck, a side frame having a tension member of box-section, a spring seat on said tension member, load supporting springs on said seat, a box-section bolster supported on said springs, aligned openings in the adjacent chords of said bolster and tension member, and a friction device between said side frame and bolster with opposite followers thereof recessed in said openings respectively, said friction device comprising a pair of friction shoes having cylindrical face engagement with respective followers, opposed wedge means operative to urge said friction shoes against said followers, and auxiliary springs between each means and the adjacent follower.

6. In a railway freight car truck, a side frame having a tension member of box-section, a spring seat on said tension member, load supporting springs on said seat, a box-section bolster supported on said springs, aligned openings in the adjacent chords of said bolster and tension member, and a friction device between said side frame and bolster with opposite followers thereof recessed in said openings respectively, each of said followers having a horizontal flange affording a seat therefor against the adjacent chord, said device comprising a load supporting spring under compression between said flanges.

7. In a railway freight car truck, a side frame having a tension member of box-section, a spring seat on said tension member, load supporting springs on said seat, a box-section bolster supported on said springs, aligned openings in the adjacent chords of said bolster and tension member, and a friction device between said side frame and bolster, said device comprising spaced followers of barrel-like form with annular flanges seated against respective chords, and a load-carrying spring compressed between said flanges.

8. In a railway freight car truck, a side frame having a tension member of box-section, a spring seat on said tension member, load supporting springs on said seat, a box-section bolster supported on said springs, aligned openings in the adjacent chords of said bolster and tension member, and a friction device between said side frame and bolster with opposite followers thereof extending through said openings, each of said followers having an annular flange affording a seat on the adjacent chord, and a load-carrying spring compressed between said flanges.

9. In a railway car truck, a support member having a box-section, a supported member having a box-section, aligned openings in adjacent chords of said members, and a friction device mounted between said members with opposite followers extending through said openings respectively, said followers housing wedging means, each of said followers having an annular flange affording a seat therefor against the adjacent chord, and a load-carrying spring seted at opposite ends against said flanges.

10. In a railway car truck, a side frame having a tension member of box-section, a spring seat on said tension member, load-supporting springs on said seat, a box-section bolster supported on said springs, aligned openings in the adjacent chords of said bolster and tension member, and a friction device between said side frame and bolster with opposed followers recessed in said openings respectively, each of said followers having a horizontal flange affording a seat therefor against the adjacent chord, said device comprising a load-carrying spring compressed between said flanges, friction shoes having frictional engagement with at least one of said followers, and means for urging said shoes into such engagement.

11. In a railway car truck, a frame member, a relatively movable member, aligned openings in said members, and a friction device between said members with opposed followers recessed in said openings respectively, each of said followers having a horizontal flange affording a seat therefor against the adjacent member, said device comprising a load-carrying spring under compression between said flanges.

12. In a railway car truck, a frame member, a relatively movable member, aligned openings in said members, and a friction device between said members comprising spaced followers extending through said openings respectively, each of said followers having a flange affording a seat therefor against the adjacent member, said device comprising friction means in frictional engagement with at least one of said followers, and a compression spring surrounding said friction means and seated at opposite ends against respective flanges.

13. In a railway car truck, a frame member, a relatively movable member, aligned openings in said members, and a friction device between said members, said device comprising spaced followers of cylindrical form recessed in said openings respectively, each of said followers having an annular flange affording a seat against the associated member at the margin of the opening therein, friction shoes in frictional engagement with at least one of said followers, wedge means operative to urge said friction shoes into such engagement, resilient means compressed between said wedge means and at least one of said followers, and a load-carrying spring having its respective ends abutting said flanges and compressed therebetween.

14. In a railway car truck, a frame member, a relatively movable member, aligned openings in said members, and a friction device between said members, said device comprising cylindrical followers extending through said openings respectively, each of said followers having a flange affording a seat therefor against the adjacent member, and resilient means compressed between said flanges.

15. In a railway car truck, a frame member, a relatively movable member, springs therebetween, aligned openings in said members, and a friction device between said members with opposite followers extending through said openings respectively, each of said followers being of cylindrical form and having a flange affording a seat therefor against the adjacent member, said device comprising friction means within said followers in frictional engagement therewith, and a load-carrying spring surrounding said friction means and having its opposite ends seated against said flanges, respectively.

CARL A. EDSTROM.